United States Patent
Fukushima et al.

(10) Patent No.: US 6,216,739 B1
(45) Date of Patent: Apr. 17, 2001

(54) INTEGRATED GAS CONTROL DEVICE

(75) Inventors: Yoshitomo Fukushima; Kazuhisa Sato, both of Yabuzuka Honmachi (JP)

(73) Assignee: Benkan Corporation, Tokyo (JP)

( * ) Notice: Subject to any disclaimer, the term of this patent is extended or adjusted under 35 U.S.C. 154(b) by 0 days.

(21) Appl. No.: 09/556,434

(22) Filed: Apr. 24, 2000

(30) Foreign Application Priority Data

Apr. 30, 1999 (JP) .................................................. 11-124377

(51) Int. Cl.[7] .................................................. F16K 11/10
(52) U.S. Cl. .......................................... 137/884; 137/613
(58) Field of Search ..................... 137/271, 613, 137/884

(56) References Cited

U.S. PATENT DOCUMENTS

| | | | |
|---|---|---|---|
| 5,819,782 | * 10/1998 | Itafuji | 137/240 |
| 6,012,469 | 1/2000 | Fukushima et al. | |
| 6,085,783 | * 7/2000 | Hollingshead | 137/597 |
| 6,109,303 | * 8/2000 | Itafuji et al. | 137/884 |
| 6,116,283 | * 9/2000 | Yamaji et al. | 137/884 |
| 6,125,887 | * 10/2000 | Pinto | 137/884 |

FOREIGN PATENT DOCUMENTS

10-300000    11/1998    (JP) .

* cited by examiner

*Primary Examiner*—John Fox
(74) *Attorney, Agent, or Firm*—Birch, Stewart, Kolasch & Birch, LLP

(57) ABSTRACT

A plurality of connecting blocks are mounted on a base plate. Each block has a base body and a vertical cylindrical portion formed on the base body, and has a vertical hole. The base body has a horizontal hole opened at both sides thereof and communicated with the vertical hole in the cylindrical portion. A plurality of intermediate blocks, each having a fixed portion and a pair of horizontal cylindrical inserting portions formed on both sides of the fixed portion are mounted on the base plate. The intermediate block has a horizontal gas passage having a pair of openings opened at upper surfaces on both sides of the fixed portion. The horizontal hole of each of the connecting blocks is engaged with the corresponding inserting portion of the intermediate block. A cylindrical connecting member having an inlet gas passage and an outlet gas passage is secured in the vertical hole of each connecting block. The outlet gas passage of the inlet side connecting member is communicated with the inlet gas passage of the outlet side connecting member. A gas control unit is secured to the connecting member.

9 Claims, 10 Drawing Sheets

INTEGRATED GAS CONTROL DEVICE

BACKGROUND OF THE INVENTION

The present invention relates to a gas control device integrated on a panel and provided in a high purity gas supply system for manufacturing a semiconductor device, so that the gas is cleaned and the supply thereof is controlled.

A conventional gas control device provided in the high purity gas supply system for manufacturing a semiconductor device comprises a plurality of independent gas control units connected by joints and pipelines, thereby to form a gas control line. The gas lines are disposed in parallel on a base plate so as to be integrated on a panel.

However, when a number of independent gas control units are connected by the pipelines and joints, the gas line becomes long and the inner capacity of the gas control device within the semiconductor manufacturing system becomes large. In addition, since each gas line has different passage structure, the gas control unit cannot be easily attached or detached. Hence the total manufacturing lead time for designing, producing and assembling the manufacturing system is increased. As a result, the initial rise time at the time of installment of the system becomes longer, and the manufacturing processes become complicated and therefore expensive. In addition, since it is difficult to replace the gas control units, the conventional device cannot deal with a situation where the flow passages must be changed.

Regarding the performance of the gas control device, there are generated welding fumes and particles which deteriorate the welded parts and hence shorten the life of the pipeline. With regard to the cost, the yield of the products is low and the cost for maintenance is high. In addition, since the gas control device cannot be reduced in size, when integrating the device on the panel, there occurs cases where the gas lines are disposed in upper and lower surfaces of the panel or in multiple layers.

In order to connect the gas control units in the gas line to a passage block, there has generally been employed the use of a flange or bolts. However, such a connecting method causes unbalance in tightening force of each bolt, thereby decreasing reliability, and moreover, the assemblage man-hour is increased, so that the cost rises.

In order to resolve these problems, the applicant of the present invention has proposed in Japanese Patent Application Laid Open 10-300000, a structure for integrating the gas control units on a panel wherein the gas control units are mounted on a base plate and connected to each other by a plurality of gas passage blocks. Such a structure will be schematically described with reference to FIG. 10.

Referring to FIG. 10, a passage block 101 has a gas inlet passage 102 and a gas outlet passage 103 formed therein. Peripheral sealing beads 104 and 105 are formed at the openings of the passages 102 and 103. An annular metal gasket 106 is disposed between the sealing bead 104 of the passage block 101 and the sealing bead 105 of the adjacent passage block 101. An external thread 107 is formed on each passage block 101 on the outer periphery thereof adjacent one end portion, and a nut 108 is engaged with the thread 107. A union nut 109 mounted on the nut 108 engages an external thread 110 formed on the outer periphery of the adjoining passage block 101 at the end portion thereof. Thus the adjacent passage blocks 101 are hermetically detachably connected to each other while communicating the gas outlet passage 103 of one block with the gas inlet passage 102 of the other block. The connected passage blocks 101, only two of which are shown in FIG. 10, are detachably mounted on a base plate 111.

Desired gas control units such as manual diaphragm valve 112 having a toggle joint and a filter unit 113 are mounted on the passage blocks 101. The diaphragm valve 112 and the filter unit 113 each has a connecting member 114 which is inserted in an upper opening 115 formed in each passage block 101 interposing a metal gasket 116. Thus a gas inlet passage 117 formed in the connecting member 114 is communicated with the gas inlet passage 102 and a gas outlet passage 118 formed in the connecting portion 114 is communicated with the gas outlet passage 103 through the gasket 116. A union nut 119 disposed on the outer periphery of the connecting member 114 is screwed on an external thread 120 formed on the outer periphery of an upper portion of the passage block 101. Thus the connecting member 114 is hermetically detachably mounted on the passage block 101. Besides the manual diaphragm valve 112 and filter unit 113, other gas control units such as an automatic diaphragm valve, mass flow controller, regulator, automatic diaphragm valve having a check valve may be selectively used.

The above-described conventional integrated gas control device is advantageous in that while the passage blocks 101 are horizontally connected to one another by way of the end portions thereof, the gas control units 112 and 113 are vertically disposed and connected to the passage blocks 101. Accordingly the gas passage structure and gas lines can be linearly disposed and the size thereof reduced, resulting in decrease in the overall size of the device.

Since the gas line can be constructed utilizing standardized parts, the passage can be largely arbitrarily constructed. Accordingly not only the total manufacturing lead time for designing, producing and assembling the manufacturing device and the initial rise time are decreased, but the arrangement of the passages can be changed with more ease when required. In addition, since the pipeline need not be welded for connecting the passage blocks 101, the fumes can be prevented from generating, so that it is possible to elongate the life of the device and to improve the yield of the products. Moreover, the gas control units 112 and 113 can be easily detached from the passage blocks 101 by simply removing the union nuts 119 on the connecting members 114, and hence easily replaced. Therefore, the maintenance of the device is simplified and the cost thereof decreased.

The union nut 119 is used in order to attach the control unit 112 or 113 to the passage block 101, so that the entire control unit can be fastened with a well-balanced force without applying couple of forces thereto. Hence a tight seal can be maintained, thereby improving reliability.

In the conventional integrated gas control device, since the adjacent passage blocks are connected to each other by way of screws, it is necessary to interpose the metal gasket 106 between the sealing beads 104 and 105 at the end portions of the passage blocks 101 so that the seal may be ensured. However, since the number of sealing portions is increased, there is a possibility of deteriorating the overall sealing effect. In order to prevent such a problem from occurring, the metal gasket 106 and sealing beads 104 and 105 must be accurately machined. Moreover, the threads 107 and 110 must be formed on the outer periphery of the passage block 101 and the nut 108 and the union 109 must be provided, resulting in the increase in machining portions and the number of parts. Accordingly, the lead time for the manufacturing the device is increased, and the manufacturing process becomes complicated so that the cost is increased. Furthermore, since a space for moving the union nut 109 engaged with the thread 110 is necessary, a sufficient space is still required between each of the gas control units 112 and 113 mounted on the passage blocks 101, thereby rendering it impossible to sufficiently shorten the gas line.

SUMMARY OF THE INVENTION

An object of the present invention is to provide an integrated gas control device wherein standardized parts are used to enable the manufacturing lead time to be decreased, distances between the gas control units to be shortened by attaching the passage blocks on a base without directly connecting the block with other blocks, and the number of machining portions and the number of parts are decreased, thereby the overall device can be made compact, light in weight, and manufactured at a low cost.

According to the present invention, there is provided an integrated gas control device comprising a base plate, at least two connecting blocks, each having a base body and a vertical cylindrical portion formed on the base body, and having a vertical hole, at least one intermediate block having a fixed portion and a pair of horizontal cylindrical inserting portions formed on both sides of the fixed portion, a pair of end blocks comprising an inlet side end block and an outlet side end block, each having a fixed portion, a horizontal cylindrical inserting portion formed on one of sides of the fixed portion, and a connecting portion formed on the other side of the fixed portion, a cylindrical connecting member having an inlet gas passage and an outlet gas passage, and engaged in the vertical hole of each connecting block, and a gas control unit secured to each connecting member.

The base body has a horizontal hole opened at both sides thereof and communicated with the vertical hole in the cylindrical portion, the intermediate block has a horizontal gas passage having a pair of openings opened at upper surfaces on both sides of the fixed portion.

The end block has a horizontal gas passage opened at an end face of the connecting portion and opened at an upper surface of the inserting portion.

The intermediate block is mounted on the base plate, the horizontal hole of each of the connecting blocks is engaged with the corresponding inserting portion of the intermediate block at one of sides of the horizontal hole, and the inserting portion of each of the end blocks is engaged with the horizontal hole of the connecting block at the other side of the hole.

The first securing means securing the fixed portions of the intermediate block and end blocks are secured to the base plate.

The inlet gas passage of the inlet side connecting member is communicated with the inlet gas passage of the inlet side end block, and the outlet gas passage is communicated with the inlet gas passage of the outlet side connecting member through the gas passage of the intermediate block, and the outlet gas passage of the outlet side connecting member is communicated with the outlet gas passage of the outlet side end block. The connecting member is secured to the connecting block by a union nut.

The vertical hole of the connecting block is downwardly extended from an upper periphery of the horizontal hole to form a deep portion, and a lower portion of the connecting member is inserted in the deep portion.

The base body of the connecting block has a cubic shape, the vertical hole has a circular cross section, and the horizontal hole has a circular cross section, and the fixed portion of the intermediate block has a cubic shape, and the inserting portion has a circular cross section to be engaged with the horizontal hole of the connecting block.

These and other objects and features of the present invention will become more apparent from the following detailed description with reference to the accompanying drawings.

DETAILED DESCRIPTION OF THE PREFERRED EMBODIMENT

Figure 1:
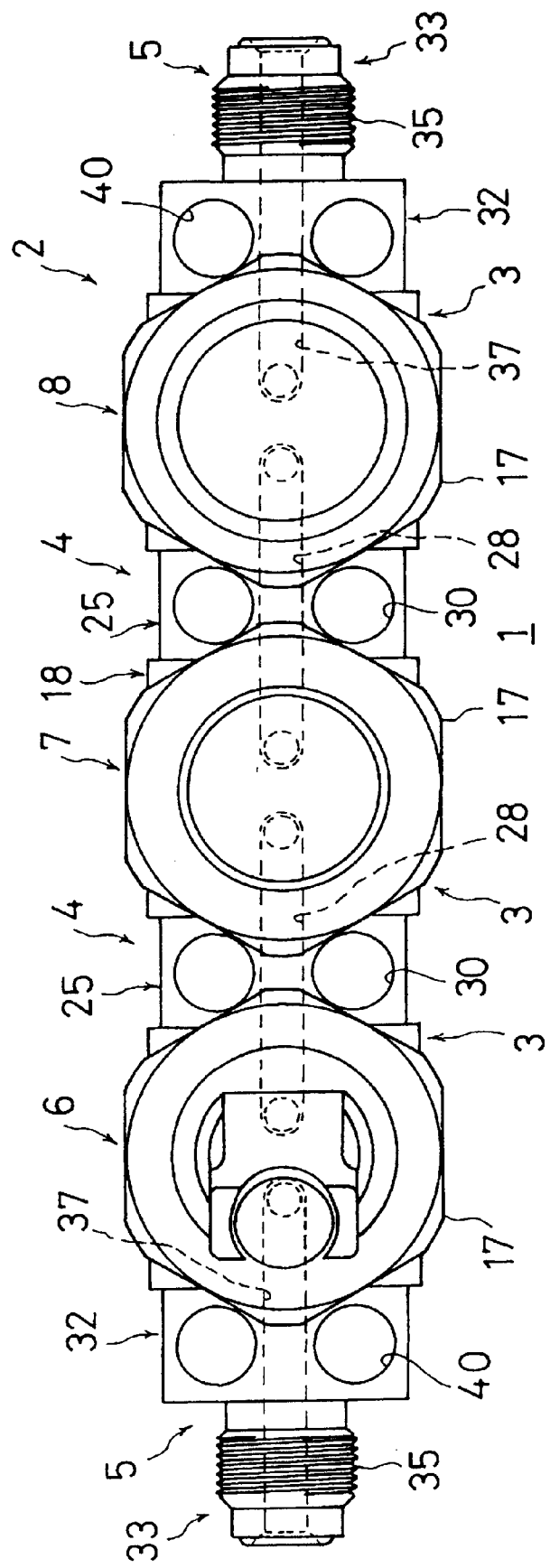
FIG. 1 is a plan view of an integrated gas control device according to the present invention.
Figure 2:
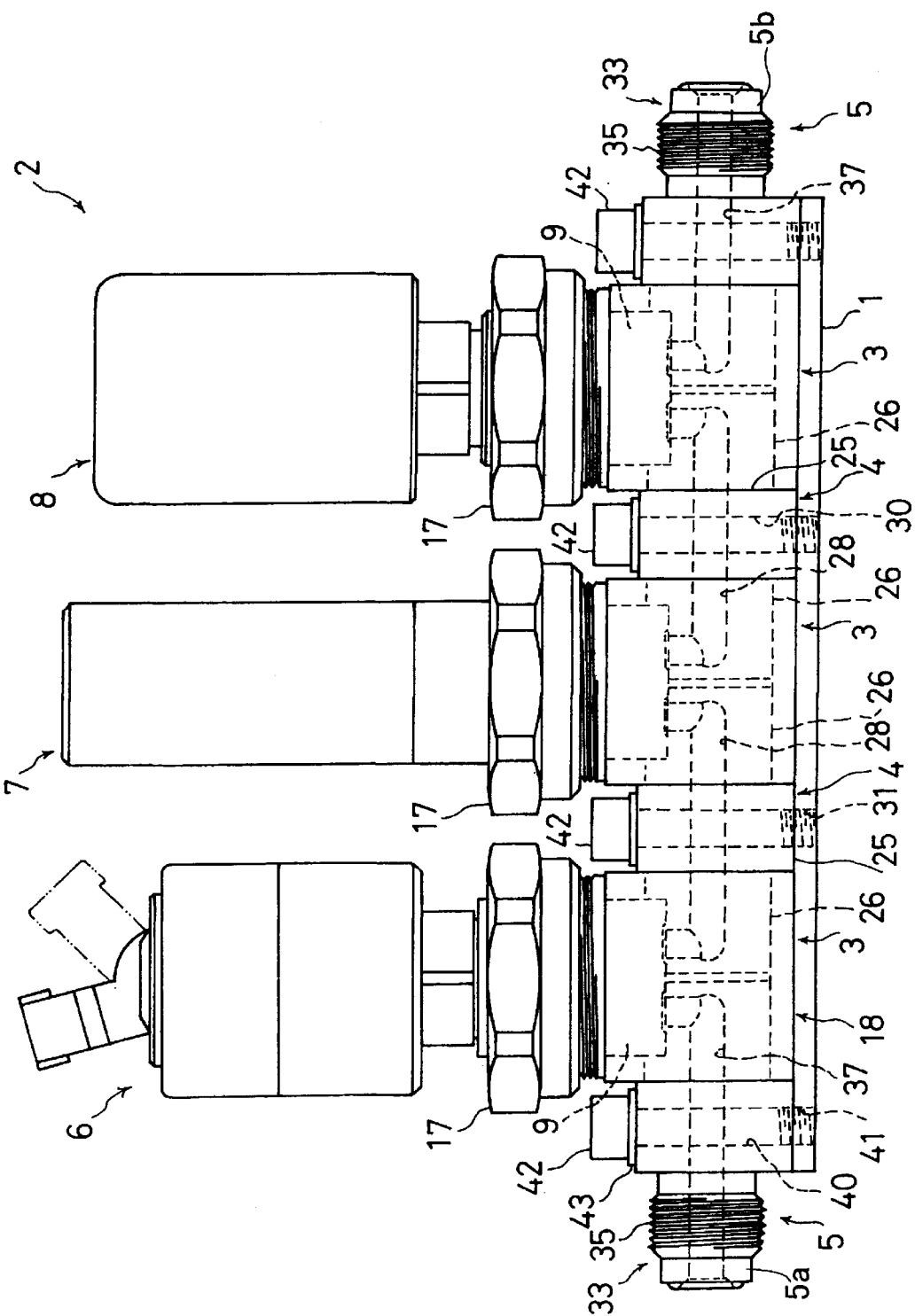
FIG. 2 is an elevational view of the integrated gas control device.
Figure 3:
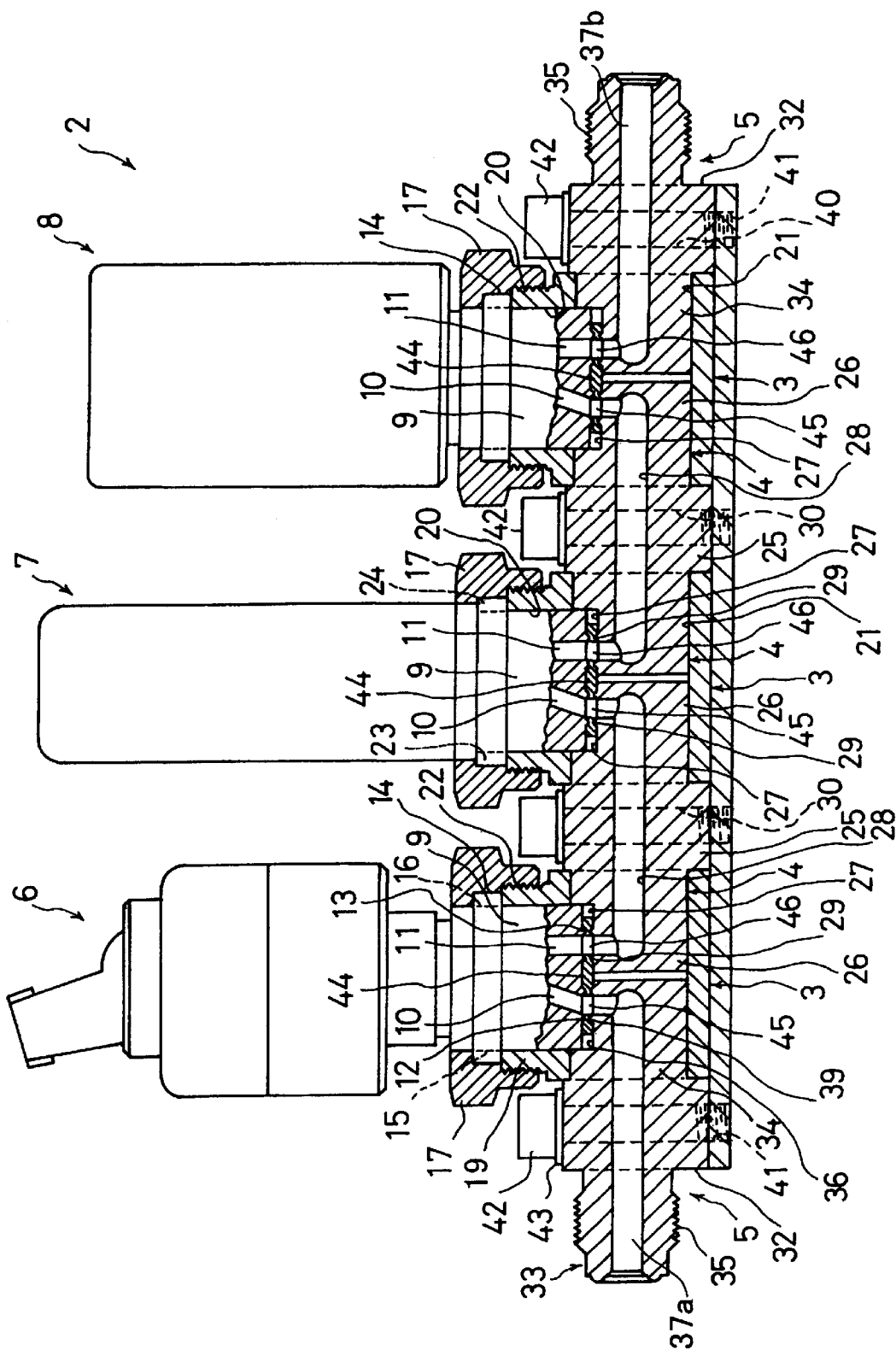
FIG. 3 is a partially cutaway elevational view of the gas control device.
Figure 4:
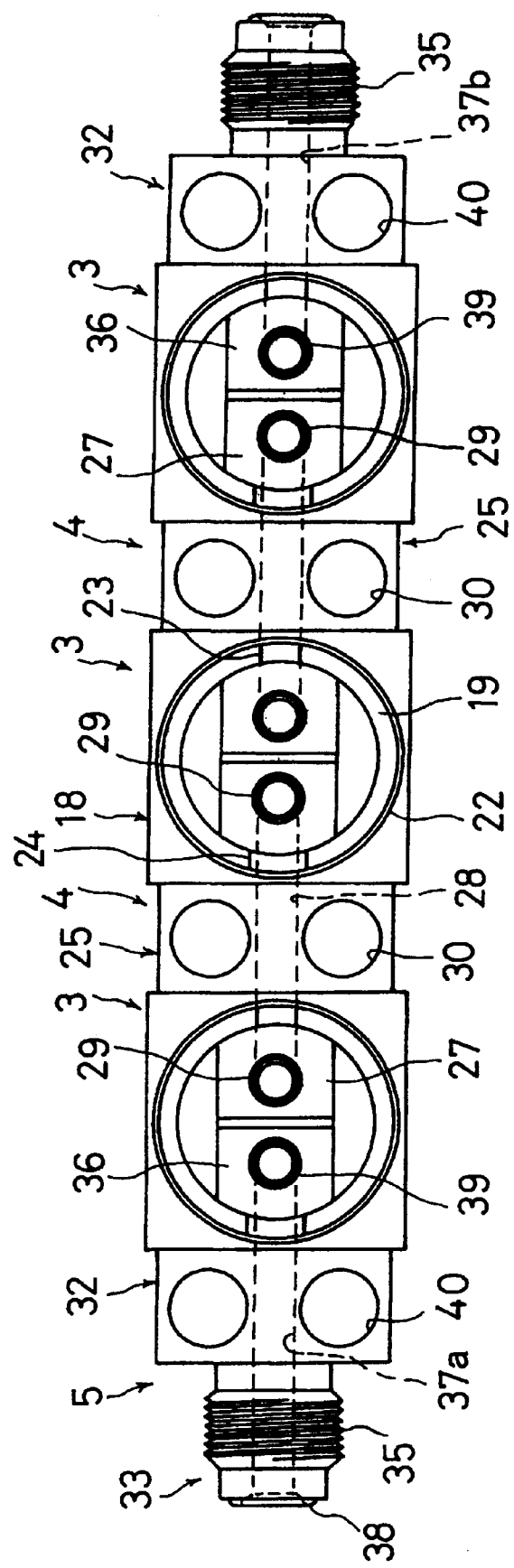
FIG. 4 is a plan view of the integrated gas control device when gas control units are dismounted.
Figure 5:
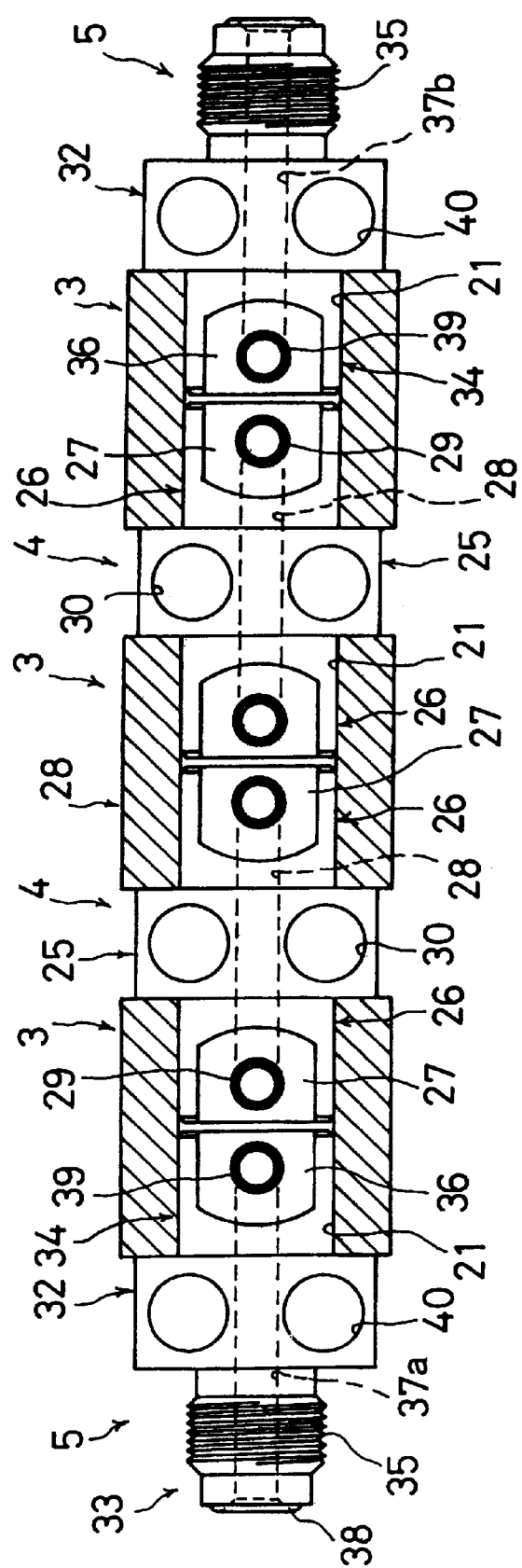
FIG. 5 is a partially cutaway plan view of the gas control device when the gas control units are dismounted.

Referring to FIGS. 1 to 3, a plurality of gas lines 2 are mounted on a base plate 1 although only one of the gas lines are shown in the figures. Each gas line 2 is provided with various vertically constructed gas control units such as a manual diaphragm valve 6 having a toggle joint, filter unit 7, and an automatic diaphragm valve 8. Other gas control units such as an automatic diaphragm valve having a check valve, regulator, mass flow controller, and a mass flow meter may be selectively provided as desired.

As shown in FIG. 2, each gas line 2 comprises a plurality of connecting blocks 3 each of which is connected to one of the gas control units 6 to 8, intermediate blocks 4 disposed between the connecting blocks 3, and a pair of end blocks 5 comprising an inlet side end block 5a and an outlet side end block 5b, each connected to one of the connecting blocks 3.

Figure 6:
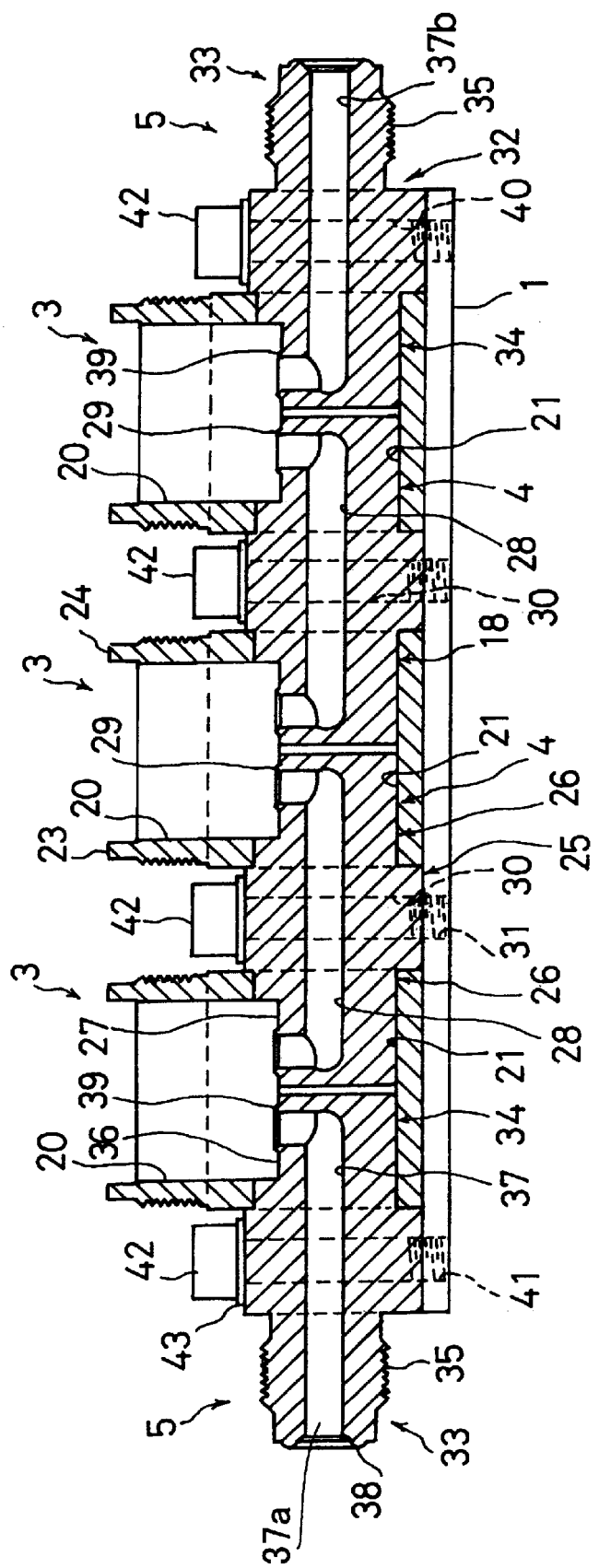
FIG. 6 is a sectional view of the gas control device when the gas control units are dismounted.
Figure 7A:
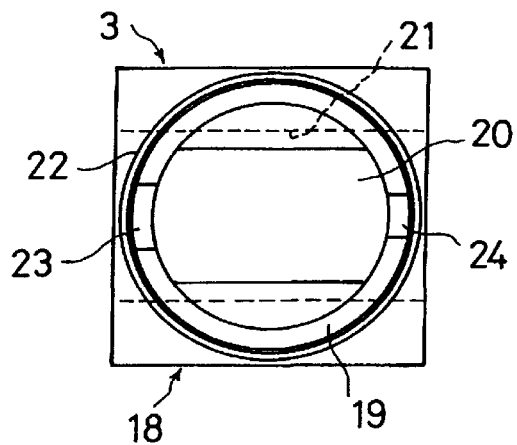
FIG. 7a is a plan view of a connecting block provided in the gas control device.
Figure 7B:
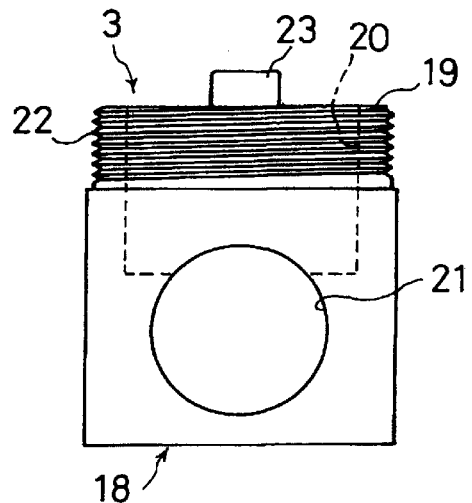
FIG. 7b is an elevational view of the connecting block.
Figure 7C:
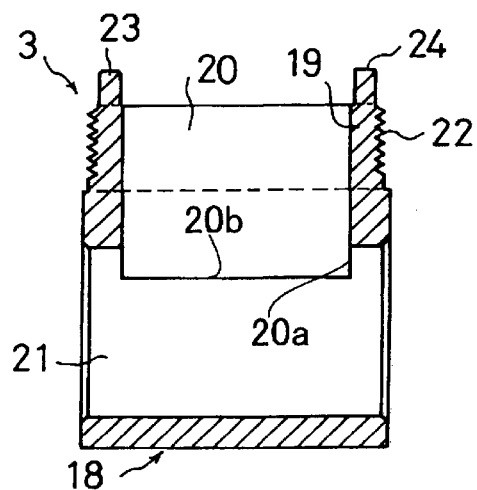
FIG. 7c is a sectional view of the connecting block.

As shown in FIGS. 7a to 7c, each connecting block 3 comprises a cubic base body 18 and a vertical cylindrical portion 19 formed on the upper surface of the base body. The underside of the body 18 is made flat so as to be mounted on the base plate 1 as shown in FIGS. 2, 3 and 6. The cylindrical portion 19 has a vertical inner hole 20 which is communicated with a horizontal hole 21 formed in the inner portion of the body 18. The hole 20 is downwardly extended from an upper periphery of the horizontal hole 21 to form a pair of deep portion 20a and a pair of shelves 20b as shown in FIG. 7c. An external thread 22 is formed on the outer periphery of the cylindrical portion 19 as shown in FIG. 7b. Furthermore, a pair of positioning lugs 23 and 24 are formed on the upper edge of the cylindrical portion 19 at positions substantially 180 degrees apart. The width of one of the positioning lugs 23 and 24 is larger than that of the other.

The hole 21 perforates the body 18 in the horizontal direction perpendicular to the hole 20. The hole 21 has a circular section and communicates with the hole 20.

Figure 8A:
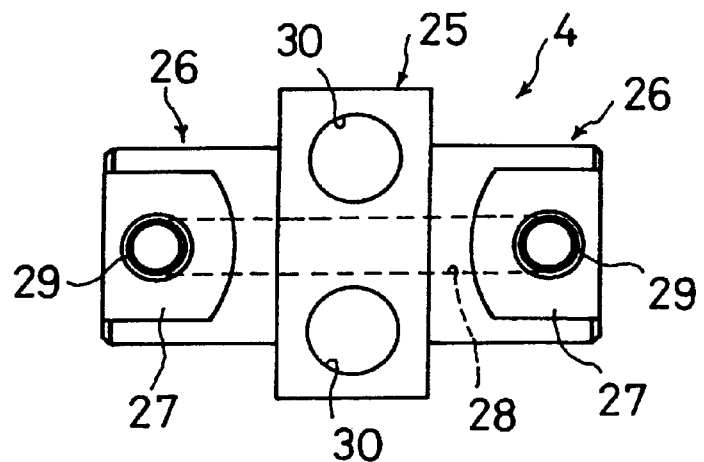
FIG. 8a is a plan view of an intermediate block provided in the gas control device.
Figure 8B:
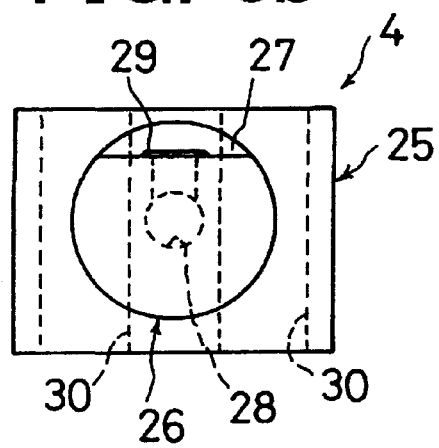
FIG. 8b is an elevational view of the intermediate block.
Figure 8C:
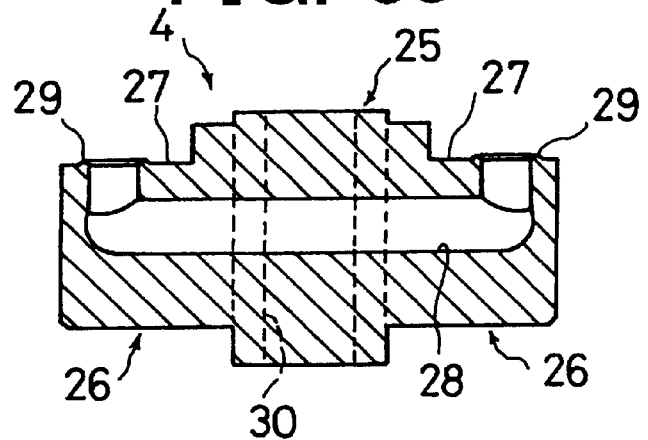
FIG. 8c is a sectional view of the intermediate block.

Referring to FIGS. 8a, 8b and 8c, each of the intermediate blocks 4 comprises a fixed portion 25 in the shape of a rectangular parallelepiped, and a pair of cylindrical inserting portions 26 formed on both sides of the fixed portion 25 and projecting therefrom in the opposite directions. The underside of the fixed portion 25 is rendered flat so as to be mounted on the base plate 1 as shown in FIGS. 2, 3, and 6. The upper surface of each of the inserting portions 26 is cut away to form a flat surface 27 shown in FIGS. 8b and 8c so that the flat surface 27 becomes flush with the shelves 20b of the hole 20.

A gas passage 28 is formed in the intermediate block 4. The gas passage 28 is horizontally formed in the axial direction of the block 4 extending through the fixed portion 25 and bent perpendicularly upward in the inserting portions 26 so as to be upwardly opened on each flat surface 27 thereof. Hence the gas passage 28 is adapted to communicate with the hole 20 of the connecting block 3. A bulging sealing bead 29 is formed along the upper periphery of each opening of the gas passage 28 on the flat surface 27.

A pair of vertical holes 30 for inserting bolts 42 are formed in the fixed portion 25 on both sides of the gas passage 28. The holes 30 are adapted to coincide with holes 31 formed in the base plate as shown in FIGS. 2, 3 and 6.

Figure 9A:
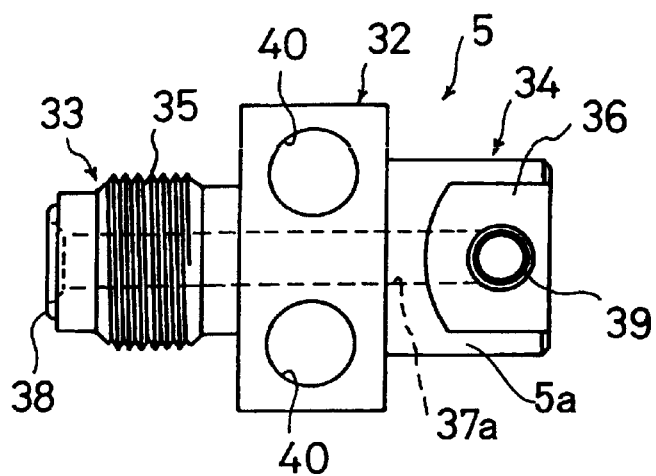
FIG. 9a is a plan view of an end block provided in the gas control device.
Figure 9B:
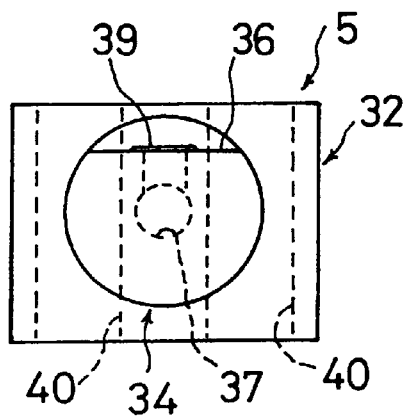
FIG. 9b is an elevational view of the end block.
Figure 9C:
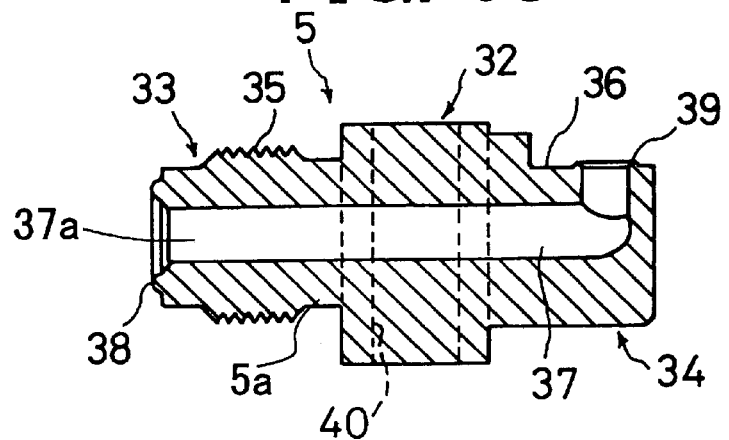
FIG. 9c is a sectional view of the end block.
Figure 10:
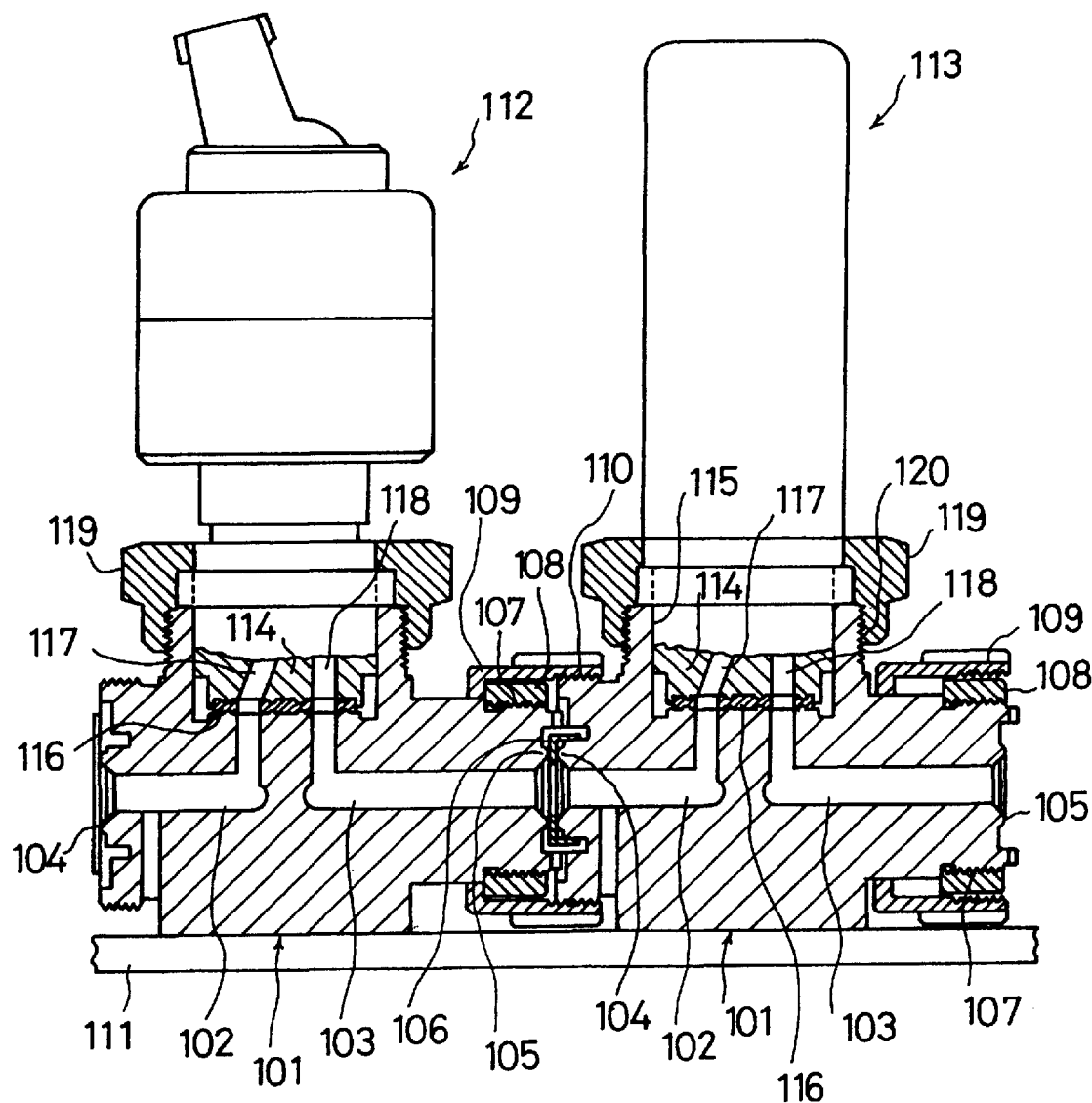
FIG. 10 is a partially cutaway elevational view of a conventional gas control device.

Referring to FIGS. 9a, 9b and 9c, showing the inlet side end block 5a, the end block 5 has a similar construction as that of the intermediate block 4 and comprises a fixed portion 32 in the shape of a rectangular parallelepiped, an inserting portion 34, and a connecting portion 33. The inserting portion 34 and the connecting portion 33 are both cylindrical and integrated with the fixed portion 32, projecting from the fixed portion 32 in the opposite directions. The underside of the fixed portion 32 is rendered flat so as to be mounted on the base plate 1 as shown in FIGS. 2, 3, and 6.

The upper surface of the inserting portions 34 is cut away to form a flat surface 36 shown in FIGS. 9b and 9c so that the flat surface 36 becomes flush with the shelves 20b of the hole 20. The connecting portion 33 has an external thread 35 on the outer periphery at the middle portion thereof.

An inlet gas passage 37a is formed in the end block 5a. The gas passage 37a is horizontally formed in the axial direction of the block 5 extending through the fixed portion 32 and bent perpendicularly upward in the inserting portions 36 so as to open on the flat surface 36 thereof. Hence the gas passage 37a is adapted to communicate with the hole 20 of the connecting block 3. In the outlet side end bock 5b, an outlet gas passage 37b is formed.

A bulging sealing bead 38 is formed on the opening of the gas passage 37 at the axial end of the connecting portion 33 and a bulging sealing bead 39 is formed along the upper periphery of the opening on the flat surface 36.

A pair of vertical holes 40 for inserting the bolts 42 are formed in the fixed portion 32 on both sides of the gas passage 37. The holes 40 are adapted to coincide with holes 31 formed in the base plate as shown in FIGS. 2, 3 and 6.

Referring to FIGS. 1 to 6, the intermediate blocks 4 are interposed between the connecting blocks 3 and the end blocks 5 are connected to the connecting blocks 3 at the end of the gas line 2. More particularly, as shown in FIG. 3, each of the inserting portions 26 of the intermediate block 4 is hermetically inserted into the hole 21 formed in the body 18 of the adjacent connecting block 3. Similarly, the inserting portion 34 of the end block 5 is hermetically inserted into the hole 21 at the end of the line 2. Hence, the flat surface 27 of the intermediate block 4 and the flat surface 36 of the end block 5 are positioned to confront the shelves 20b of the connecting block 3. As a result, the gas passages 28 and 37 are each communicated with the inner hole 20.

The thus connected connecting blocks 3, intermediate blocks 4 and the end blocks 5 are mounted on the base plate 1 so that the flat surfaces of each of the body 18 and fixed portions 25 and 32 contacts the upper surface of the base plate 1. The holes 30 and 40 of the connecting portions 25 and 32 respectively coincide with the threaded holes 31 and 41. The bolts 42 are secured in the aligned holes 30 and 31, 40 and 41, interposing washers 43 between the underside of a head of the bolt 42 and the upper surface of the fixed portion 25 and 32 as shown in FIG. 6. Thus the blocks 3, 4 and 5 are detachably screwed on the base plate 1.

Referring to FIG. 3, a cylindrical connecting member 9 is engaged in the vertical hole 20 of the connecting block 3. The underside of the connecting member 9 is made flat. An inlet gas passage 10 and an outlet gas passage 11 are formed in the connecting member 9. The inlet gas passage 10 and the outlet gas passage 11 open on the flat underside of the connecting member 9. Sealing beads 12 and 13 are provided around the openings of the passages 10 and 11, respectively. A flange 14 is formed on the outer periphery of the connecting member 9. The flange 14 has a pair of positioning recesses 15 and 16 disposed substantially 180 degrees apart. The recesses 15 and 16 are adapted to engage with the positioning lugs 23 and 24, respectively, formed on the upper periphery of the connecting block 3. A union nut 17 is rotatably disposed around the flange 14. Each of the gas control units 5 6, 7 and 8 is mounted on the connecting member 9.

In the present embodiment, the manual diaphragm valve 6 is mounted on the connecting block 3 at the upper stream of the gas line 2, the filter unit 7 on the connecting block 3 at the middle portion, and the automatic diaphragm valve 8 on the connecting block 3 at the lower stream.

In order to attach each of the gas control units 6, 7 and 8, each connecting member 9 is inserted in the hole 20 of the connecting block 3. More particularly, the lower portion of the connecting member 9 below the flange 14 is inserted into the hole 20 so that the flat underside of the connecting member 9 abuts on the flat surfaces 27 of the intermediate member 4 or on the surface 27 and the surface 36 of the end block 5. A metal gasket 44 is disposed between the underside of the connecting member 9 and the surfaces 27 or 36. The connecting member 9 is rotated so that the recess 15 formed on the flange 14 thereof engages the positioning lug 23 of the connecting body 3 and the recess 16 engages the positioning lug 24. Since the width of the lug 23 differs from the width of the lug 24, the connecting member 9 is correctly inserted with respect to the circumferential direction. Thus the inlet gas passage 10 and the outlet gas passage 11 are correctly positioned.

Namely, in the case of the manual diaphragm valve 6, the inlet gas passage 10 is communicated with the gas passage 37 of the up stream end block 5 through a hole 45 formed in the gasket 44 while the outlet gas passage 11 is communicated with the gas passage 28 of the intermediate block 4 through a hole 46 also formed in the gasket 44. Similarly, in the case of the filter unit 7, the inlet gas passage 10 is communicated with the gas passage 28 formed in the intermediate block 4 and the outlet gas passage 11 is communicated with the gas passage 28 of another intermediate block 4. The inlet gas passage 10 of the automatic diaphragm valve 8 is communicated with the gas passage 28 and the outlet gas passage 11 is communicated with the gas passage 37 of the down stream end block 5.

Thereafter, the union nut 17 mounted on the connecting member 9 is rotated so that the inner thread thereof engages with the external thread 22 formed on the cylindrical portion 19 of the connecting block 3 so as to be fastened. Hence the connecting member 9 is securely hermetically inserted in the hole 20 of the connecting block 3, the gasket 44 depressed into the sealing beads 39, 29, 12 and 13. The connecting portion 33 of one of the end blocks 5 is communicated with a gas supply while that of the other end block is communicated with a desired gas receiving device. A desired number of gas lines 2 are thus mounted on the base plate 1, thereby forming an integrated gas control device.

In the thus constructed integrated gas control device, each of the gas control units can be replaced simply by loosening the union nut 17, removing the unit from the connecting block 3, and mounting a new unit on the block 3 as before. The number of the intermediate blocks 4 and the connecting blocks 3 can be arbitrary determined in each gas line 2 so that the number of the gas control units is increased or decreased as desired.

The high purity gases, for example, nitrogen gas, hydrogen gas, monosilane, disilane, phosphine diluted with hydrogen, dinitrogen monoxide ($N_2O$), and chlorine trifluoride are controlled of their pressure, flow rate, mixing, and purging without fail by operating the gas control units which are vertically mounted on the connecting blocks 3 such as the automatic diaphragm valve 8.

In the integrated gas control device of the present invention, the gas control units can be easily attached and detached by loosening and fastening the union nut 17 without disassembling the gas lines 2. Thus the maintenance of the device is simplified and the cost thereof decreased. Since the each gas line 2 comprises a standardized connecting blocks 3, intermediate blocks 4, and end blocks 5 so that not only a gas passage structure can be highly arbitrarily determined, but also the total manufacturing lead time for designing, producing and assembling the device is decreased. In addition, the gas passage structure can be shortened and linearized. Furthermore, the arrangement of the passages and the units can be readily changed with ease when required.

The inserting portions 26 and 34 of the intermediate block 4 and end block 5, respectively, confront each other with only a short distance in between. Thus the length of the gas line 2 substantially corresponds to the total length of end blocks 5 and the intermediate blocks 4. Only the fixed portions 25 and 32 exist adjacent the connecting blocks 3 and each block need not be connected to the adjacent block by screw. Hence the distances between the gas control units can be decreased as much as possible, thereby substantially reducing the length of the gas line 2.

Since the cylindrical portion 19 has the deep portion 20a, the control unit such as the filter unit 7 sinks in the deep portion 20a so that the height of the gas control units is reduced. Thus the level at which the units are mounted can be lowered. Moreover, due to the flat surfaces 27 and 36, vertical lengths of the gas passages 28 and 37 which open at the positions above the surfaces 27 and 36 can be reduced, thereby substantially decreasing the dead volume from the inlet gas passage 10 to the outlet gas passage 11. As a result, the gas control device can be further rendered compact and light in weight.

Since the intermediate block 4 and the end block 5 are connected to each other only by inserting the inserting portions thereof into the connecting block 3 and not by screws, and the fixed portions 25 and 32 of the intermediate block 4 and the end block 5 are fastened to the base plate 1 from above by bolts 42 engaged with the holes 31 and 41 in the downward direction, the attaching operation is simplified and moreover, becomes speedy. In addition, the number of machining portions and parts is reduced. The connecting member 9, connecting block 3, intermediate block 4 and the end block 5 are standardized so that the manufacturing lead time and the manufacturing cost are further decreased.

Although the connecting member 9 may be provided with an external thread and the cylindrical portion 19 of the connecting block 3 may be provided with an inner thread so that the connecting member 9 is screwed into the hole 20, when the connecting member 9 is attached to the connecting block 3 by the union nut 17 provided on the outer periphery of the connecting member 9 as in the presently described embodiment, particles which are generated when fastening and releasing the screws are prevented from entering into the hole 20.

While the invention has been described in conjunction with preferred specific embodiment thereof, it will be understood that this description is intended to illustrate and not limit the scope of the invention, which is defined by the following claims.

What is claimed is:

1. An integrated gas control device comprising:

a base plate;

at least two connecting blocks, each having a base body and a vertical cylindrical portion formed on the base body, and having a vertical hole, the base body having a horizontal hole opened at both sides thereof and communicated with the vertical hole in the cylindrical portion;

at least one intermediate block having a fixed portion and a pair of horizontal cylindrical inserting portions formed on both sides of the fixed portion, the intermediate block having a horizontal gas passage having a pair of openings opened at upper surfaces on both sides of the fixed portion;

a pair of end blocks comprising an inlet side end block and an outlet side end block, each having a fixed portion, a horizontal cylindrical inserting portion formed on one of sides of the fixed portion, and a connecting portion formed on the other side of the fixed portion, the end block having a horizontal gas passage opened at an end face of the connecting portion and opened at an upper surface of the inserting portion;

the intermediate block being mounted on the base plate, the horizontal hole of each of the connecting blocks being engaged with the corresponding inserting portion of the intermediate block at one of sides of the horizontal hole, and the inserting portion of each of the end blocks being engaged with the horizontal hole of the connecting block at the other side of the hole;

first securing means securing the fixed portions of the intermediate block and end blocks to the base plate;

a cylindrical connecting member having an inlet gas passage and an outlet gas passage, and engaged in the vertical hole of each connecting block, the inlet gas passage of the inlet side connecting member being communicated with the inlet gas passage of the inlet side end block, and the outlet gas passage being communicated with the inlet gas passage of the outlet side connecting member through the gas passage of the intermediate block, and the outlet gas passage of the outlet side connecting member being communicated with the outlet gas passage of the outlet side end block;

second securing means securing the connecting member to the connecting block; and a gas control unit secured to each connecting member.

2. The device according to claim 1 wherein the vertical hole of the connecting block is downwardly extended from an upper periphery of the horizontal hole to form a deep portion, and a lower portion of the connecting member is inserted in the deep portion.

3. The device according to claim 1 wherein the base body of the connecting block has a cubic shape, the vertical hole has a circular cross section, and the horizontal hole has a circular cross section.

4. The device according to claim 1 wherein the first securing means is a bolt.

5. The device according to claim 2 wherein the second securing means is a union nut to be engaged with an external thread formed on a periphery of the cylindrical portion of the connecting block.

6. The device according to claim 2 wherein the fixed portion of the intermediate block has a cubic shape, and the inserting portion has a circular cross section to be engaged with the horizontal hole of the connecting block.

7. The device according to claim 2 wherein the fixed portion of the end block has a cubic shape, and the inserting portion has a circular cross section to be engaged with the horizontal hole of the connecting block.

8. The device according to claim 2 wherein the connecting member has a circular cross section to be engaged with the vertical hole of the connecting block.

9. The device according to claim 4 wherein the connecting member has a flange engaged with an inside wall of the union nut.

* * * * *